Nov. 10, 1931.   H. F. STOCK   1,831,083
PRESSURE OPERATED CLUTCH
Filed April 14, 1927   2 Sheets-Sheet 1

INVENTOR
Henry F. Stock
BY
ATTORNEY

Nov. 10, 1931. H. F. STOCK 1,831,083
PRESSURE OPERATED CLUTCH
Filed April 14, 1927 2 Sheets-Sheet 2
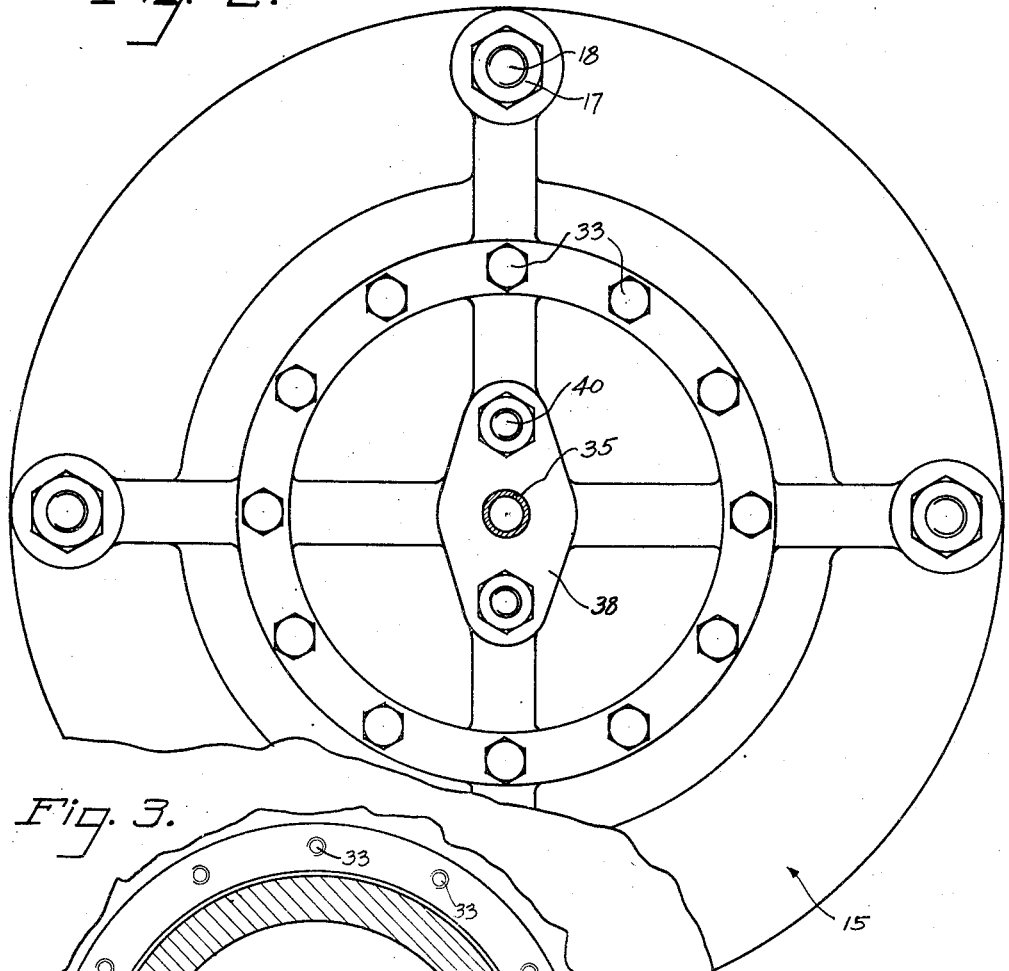
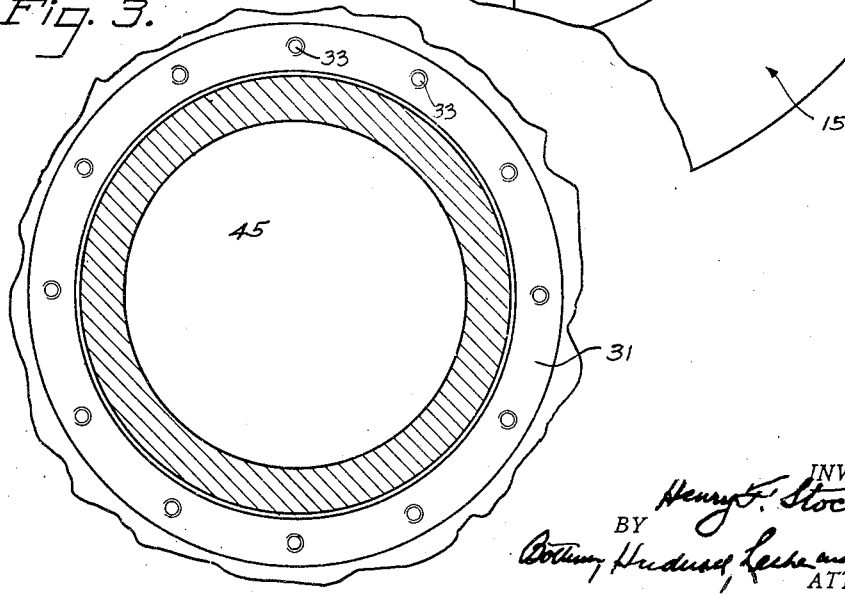

Patented Nov. 10, 1931

1,831,083

UNITED STATES PATENT OFFICE

HENRY F. STOCK, OF WAUKESHA, WISCONSIN, ASSIGNOR TO MICHAEL YUNDT COMPANY, OF MILWAUKEE, WISCONSIN, A CORPORATION OF WISCONSIN

PRESSURE OPERATED CLUTCH

Application filed April 14, 1927. Serial No. 183,670.

This invention relates to a pressure operated clutch especially designed for use with bottle cleaning apparatus.

An important object of the invention is to provide a clutch of this character which may be advantageously used for controlling the drive of the various instrumentalities of a bottle cleaning apparatus, and which is adaptable for automatic, as well as manual control, from different distant points of control.

Another object of the invention is to provide a clutch of this character and having these advantages and capacities, and which does not require nor permit tampering or adjustment liable to result in faulty operation or impairment of the clutch or of other parts of the bottle cleaning apparatus. The wear is taken up as it occurs without the necessity of manual adjustment.

Another object is to provide a clutch of this character which utilizes a self-contained fluid pressure motor for actuating the same and which is simple in construction, reliable and smooth in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 2 is a view in end elevation looking toward the left of Figure 1, and

Figure 3 is a view in section on line 3—3 of Figure 1.

Figure 1:
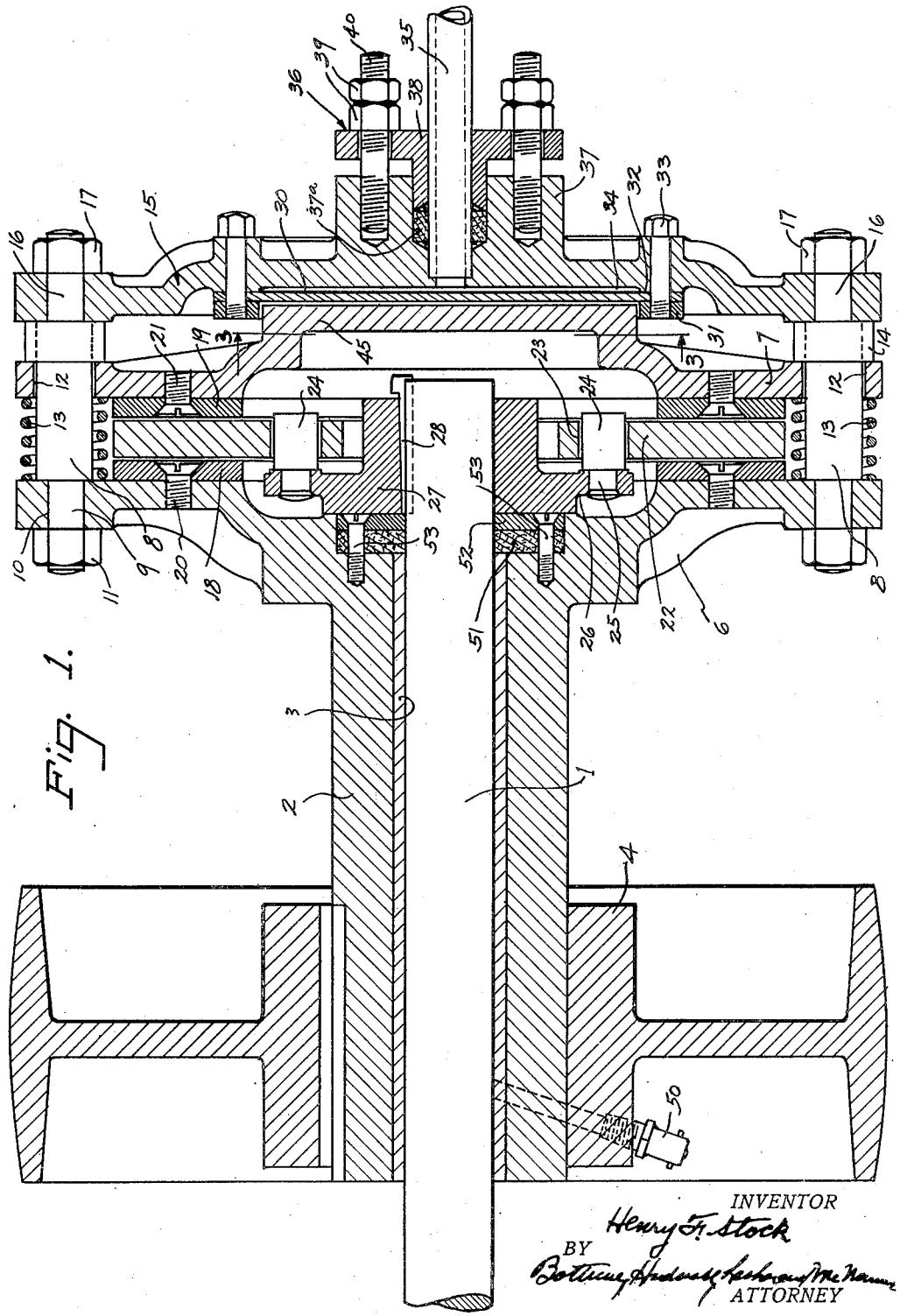
Figure 1 is a view partly in elevation and partly in longitudinal central vertical section showing one embodiment of the invention.

Referring to the drawings, numeral 1 designates a driven shaft which is journalled in suitable bearings provided therefor, and which is connected in any suitable manner to the various instrumentalities of the bottle cleaning apparatus. A drive shaft 2 in the form of a sleeve is rotatably fitted on the driven shaft 1, a bushing 3 being interposed between the shaft 1 and the shaft 2. At one end thereof, power is applied to the shaft 2, as for example, through a pulley 4 fixed to the shaft 2. Adjacent the pulley 4, the periphery of the shaft 2 is machined and otherwise adapted to be journalled in a combined radial and thrust bearing whereby to constrain the shaft 2 against axial movement while leaving it free to rotate.

At the end of the shaft opposite the pulley 4 a driving clutch member 6 is provided and may be integral with the shaft 2. As shown, the driving clutch member 6 has the general form of a disk. A coacting driving clutch member 7 is provided and is mounted on a plurality of bolts designated generally at 8. The bolts 8 have reduced ends 9 passing through openings 10 provided therefor in the disk 6 and are engaged by nuts 11 which serve to rigidly secure the bolts 8 to the disk 6. The disk 7 has openings 12 which loosely fit the bolts 8 whereby the disk 7 is free to shift axially along the bolts 8 although constrained to rotate therewith. Expansible coil springs 13 are mounted on the bolts 8 between the driving clutch members 6 and 7 and tend to force these clutch members 6 and 7 apart. The movement of the clutch member 7 away from the clutch member 6 is limited by the engagement of the clutch member 7 with spacing collars 14 mounted on the bolts 8 beyond the driving clutch member 7 and abutting a disk like carrier 15 secured on reduced end portions 16 of the bolts 8 by means of nuts 17. The driving clutch members 6 and 7 have annular facing plates 18 and 19 respectively, these facing plates being secured to their respective clutch members by means of screws 20 and 21 having their heads countersunk in the facing plates. The facing plates may be made of any suitable material having the desirable coefficient of friction and other desirable properties. A driven clutch member 22 which has the form of a disk is interposed between the facing plates 18 and 19 of the driving clutch members 6 and 7. Adjacent and around the inner periphery of the driven clutch disk 22 a series of openings 23 is provided whereby to float the driven disk on studs 24 securely fixed as at 25 to the flange 26 of a collar 27 securely and rigidly fixed as at 28 to the driven shaft 1. Any suitable number of studs 24 are provided and they serve to constrain the shaft 1 to rotate with the disk 22 while permitting the disk 22 to automatically adjust itself as may be necessary to obtain the proper engagement with the facing plates 18 and 19 of the driving clutch members.

A flexible diaphragm 30 is fastened to the carrier 15 by means of an annular clamping ring 31 which, with the aid of stud bolts 33 passing through bolt holes provided therefor in the carrier and threaded into the clamping ring 31, clamps the margin of the diaphragm to a raised annular seat 32 on the carrier 15. Beneath the diaphragm the raised seat 32 defines a pressure chamber 34 to which compressed air or other fluid pressure is supplied through a valve controlled fluid pressure supply pipe 35. The pipe 35 may have any desirable extent and may have manually and automatically controlled valves incorporated therein at different distant or remote points of control. This pipe 35 is stationary and the carrier 15 rotates with the clutch, and therefore, in order to provide a fluid tight connection and yet permit the relative rotation, a stuffing box or gland designated generally at 36 is provided on the carrier 15 for the pipe 35. This stuffing box or gland 36 comprises a flange 37 integral with the carrier 15 and defining a recess for the reception of packing 37ª which is pressed into packing engagement with the pipe 35 by a follower 38 which may be adjusted by means of nuts 39 mounted on studs 40.

The driving clutch member 7 has its central portion formed with an axially offset cylindrical projection 45 which fits within the ring 31 and has a smooth outer surface engaged by the diaphragm 30.

In operation, with power applied to the pulley 4, the sleeve shaft 2 rotates freely about the driven shaft 1 as long as air under pressure is not applied to the pressure chamber 34, since with no pressure in the chamber 34, the springs 13 act to move the driving clutch member 7 away from the driving clutch member 6 whereby to disengage the clutch facing rings 18 and 19 from the driven disk 22. Whenever pressure is supplied to the pressure chamber 34 the diaphragm 30 is flexed or extended to the left, as viewed in Figure 1, and acts on the projection 45 of the driving clutch member 7 to shift the driving clutch member 7 toward the driving clutch member 6, whereby the facing rings 18 and 19 of the driving clutch members 6 and 7 grip the driven disk 22, the springs 13 being compressed to permit of this action. When the facing rings 18 and 19 engage the disk 22, the drive is transmitted from the sleeve shaft 2 to the driven shaft 1 through the clutch members 6 and 7, their facing rings 18 and 19, the driven disk 22, the studs 24 and the collar 27. As soon as the pressure is exhausted from the pressure chamber 34 the springs 13 move the driving clutch member away from the driving clutch member 6, thereby disengaging the rings 18 and 19 from the driven disk 22.

The pressure chamber 34 and diaphragm 30 provide a fluid pressure motor which is self contained within the clutch unit. It is to be noted that the carrier 15 while rotating with the clutch members, is fixed with respect to the driving clutch member 6, the driving clutch member 7 being the shiftable member of the clutch which is moved back and forth to cause the clutch to be engaged and disengaged.

A lubricating fitting 50 may be provided to lubricate the shafts 1 and 2, and in order to prevent the lubricant so supplied from finding its way into the clutch, packing 51 is provided at the end of the shaft on which the driving clutch member 6 is formed. This packing 51 is retained in position and maintained in proper engagement with the shaft 1 by means of a pressure plate 52 fastened to the sleeve shaft 2 by means of screws 53 which have their heads countersunk in the pressure plate.

The invention claimed is:

1. A device of the character described comprising a pair of clutch members, at least one of which is axially shiftable, a third clutch member interposed between the pair of clutch members and engaged therewith and disengaged therefrom upon shifting of said axially shiftable clutch member, spring means for maintaining the clutch members disengaged, a carrier mounted on one of the pair of clutch members to rotate therewith and fixed in relation thereto, said axially shiftable clutch member having an axially offset cylindrical projection, a disc-like diaphragm positioned up against the carrier, means for clamping the periphery of the diaphragm to to the carrier, the carrier being recessed beneath the body of the diaphragm to provide a pressure chamber, the projection of the axially shiftable clutch member extending into the space within the clamping means and in close proximity to the diaphragm, the diaphragm being free of the clutch members but being engageable, when expanded, with the projection of the axially shiftable clutch member, and means for supplying fluid under pressure to the pressure chamber.

2. A device of the character described comprising a driving sleeve shaft, a driving clutch member fixed thereto, a carrier, means for fixedly supporting the carrier on the driving clutch member and in spaced relation thereto, a cooperable driving clutch member supported on said means for axial shifting movement but constrained to rotate therewith, a fluid pressure motor mounted on the carrier and cooperable with said axially shiftable clutch member, a driven shaft extending through the sleeve shaft and terminating between the driving clutch members and a driven clutch member mounted on said driven shaft and interposed between said driving clutch members.

3. A device of the character described comprising a driving sleeve shaft, a driving clutch member fixed thereto, a carrier, a plurality of bolts for fixedly mounting the carrier on the driving clutch member in spaced relation thereto, a cooperable driving clutch member having openings receiving the bolts whereby the cooperable driving clutch member is mounted for axial shifting movement although constrained to rotate with the driving sleeve shaft, a diaphragm mounted on the carrier and free of the clutch members but engageable, when expanded, with the axially shiftable driving clutch member to shift the same, means cooperable with the carrier for supplying fluid under pressure beneath the diaphragm, a driven shaft extending through the sleeve shaft and terminating between the driving clutch members, a driven clutch member interposed between the driving clutch members and means connecting the driven clutch member with the driven shaft while permitting the same to float to a limited extent to permit the driven clutch member to adjust itself automatically for proper engagement with the driving clutch members.

In witness whereof, I hereto affix my signature.

HENRY F. STOCK.